June 6, 1961 L. R. BLAKE 2,987,001

DYNAMO-ELECTRIC MACHINES

Filed April 15, 1957

INVENTOR
LESLIE REGINALD BLAKE
By
ATTORNEY

United States Patent Office 2,987,001
Patented June 6, 1961

2,987,001
DYNAMO-ELECTRIC MACHINES
Leslie Reginald Blake, Rugby, England, assignor to The British Thomson-Houston Company, London, England, a British company
Filed Apr. 15, 1957, Ser. No. 652,818
Claims priority, application Great Britain Apr. 18, 1956
5 Claims. (Cl. 103—1)

This invention relates to dynamo-electric machines as represented by so-called electromagnetic pumps in which an electrically conductive liquid to be pumped, for instance a liquid metal, is propelled along a duct under the action of a transverse electromagnetic field, the operation being based on similar principles to that of a conventional electric motor. In particular the invention is concerned with polyphase alternating current electromagnetic pumps of the so-called annular linear induction kind in which a travelling magnetic field is set up along at least part of the length of a duct of annular cross-section by a linear polyphase winding which, together with an appropriate magnetic structure, is disposed about the outside of the duct, the duct itself surrounding an auxiliary, inner magnetic structure through which the field induced by the winding can pass.

By a linear polyphase winding is meant one which produces a travelling field moving in a substantially linear direction, as distinct from the rotating field produced in a conventional induction motor, and it is to be understood that such winding may be effectively constituted by a number of separate windings appropriately positioned along the duct for energisation from different phases of a polyphase supply. The polyphase winding preferably is graded so that the maximum instantaneous magnetic flux density induced through the liquid being pumped increases gradually from zero or some low value at each end of the annular duct to a maximum value obtaining at the middle or over a mid-portion of the annular duct, this grading having the effect of reducing induction of eddy currents in the liquid due to its motion through the flux produced in the region of the ends of the winding, thereby also reducing losses resulting from these eddy currents. Furthermore for the purposes of the present specification the term annular is to be taken as including other analogous, non-circular forms, although it is expected that the circular form will be more usual.

In the annular linear induction pump of the invention, the inner magnetic structure which the annular duct surrounds has an annular form within and along which extends a further, inner duct communicating at one end with the annular duct thereby to provide a reverse flow path along which conductive liquid being pumped, entering one of the ducts at the other end of the pump, will pass successively and in opposite directions through the two ducts before leaving the other duct at the same end of the pump as it entered.

The annular magnetic structure about which the annular, outer duct is defined in such a pump is advantageously built up from radially disposed axially extending magnetic laminations, as is also the magnetic structure disposed about the outside of this duct. In constructing the pump it is difficult, however, to control the positioning of the laminations if they are assembled individually in the space between the annular duct and the inner duct; moreover, should the conductive liquid leak from either of the ducts and find its way between the laminations, an effective short-circuited turn may be created. Consequently, with a view to avoiding these difficulties, the laminations are assembled into a plurality of individually sealed packets circumferentially distributed to define together the overall annular form of said structure.

In order that the invention may be more fully understood, reference will now be made to the accompanying drawings in which.

Figure 1:
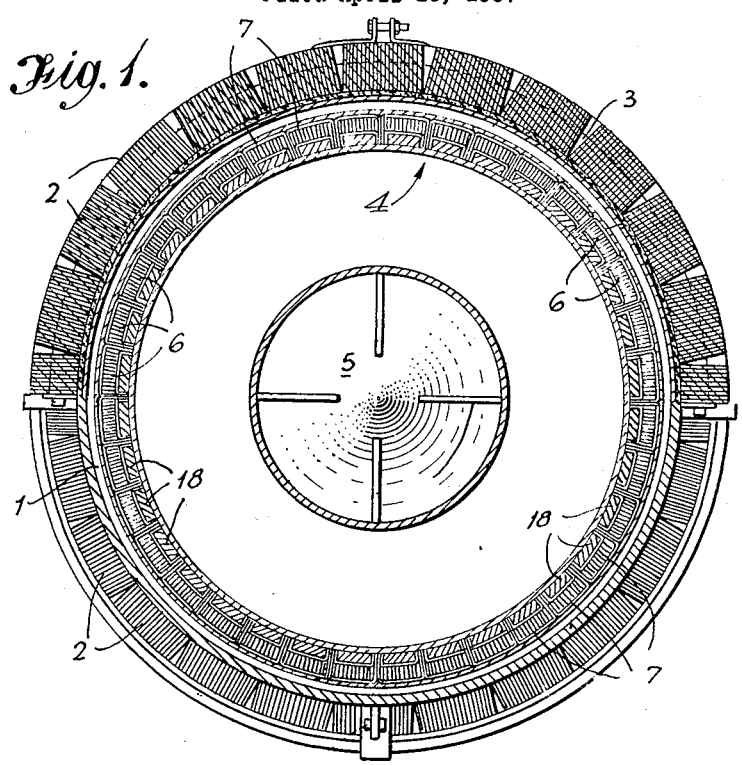
FIG. 1 is a part cross-sectional view looking along a reverse flow A.C. electromagnetic pump of the annular linear induction kind embodying the invention, the inner magnetic structure thereof being constituted by packeted laminations.

Referring to FIG. 1, the electromagnetic pump essentially comprises an annular duct 1 located between a surrounding magnetic structure 2, which is made up of radial laminations and carries a linear polyphase winding 3 in slots therein, and an inner annular magnetic structure 4 within and along which extends an inner duct 5. At the far end of the pump, that is, the end towards which one is looking in FIG. 1, the two ducts are connected by a bell-shaped channel (not shown) which provides a re-entrant transition from the annular cross-section of the duct 1 to the full circular cross-section of the duct 5. A reentrant path is thereby provided such that conductive liquid being pumped, entering one of the ducts at the near end of the pump, passes along that duct to the far end and returns along the other duct to leave the pump at the same end as it entered. The pumping action is produced in the annular duct 1 in known manner by the action of the travelling magnetic field set up by the polyphase winding, this field extending radially across the duct 1 and "travelling" along it, that is, in a direction perpendicular to the plane of the drawing, as previously explained.

The inner annular magnetic structure 4 is built up of generally radial laminations 6 which are assembled into a plurality of individually sealed packets 7 as will now be described with reference to FIGS. 2 and 3, these packets of laminations being circumferentially distributed so as together to make up the annular form of the structure 4.

Figure 2:
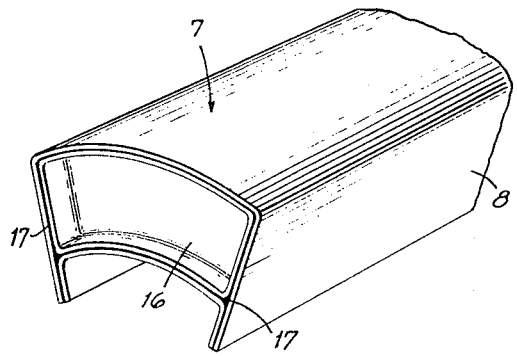
FIG. 2 is an enlarged perspective view of a single packet of laminations.
Figure 3:
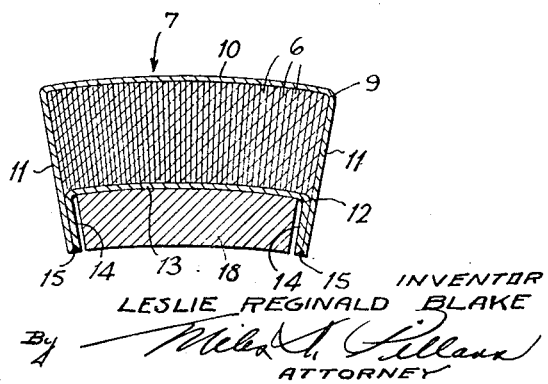
FIG. 3 is a cross-section end view of Fig. 2.

Referring now to FIGS. 2 and 3, which show a preferred form which each packet 7 of laminations 6 may take, the laminations 6 making up the packet are contained in a casing 8 of a suitable metal such for instance as "Nimonic" steel. This casing 8 is constituted by a main channel-shaped member 9 comprising an arcuate portion 10 and two radial side portions 11, together with a closure member 12 effectively sealed in position to enclose the laminations 6 within the channel 9. The closure member 12, which as shown is also channel-shaped, and comprises an arcuate portion 13 with radial side portions 14 shorter than those (11) of the main channel member 9, is dimensioned to fit between the side portions 11 of the main channel member 9 and is sealed thereto along the adjacent outer edges of the two members 9 and 12 as by welding, this having been indicated at 15. The casing 8 is completed by means of end members 16 which are shown as having a concave form dimensioned to fit within the end of the casing 8 as defined by the main channel member 9 and the closure member 12, these last two members and the end member 16 being sealed together, again as by welding, along adjacent edges as indicated at 17.

An advantage of using the channel shape for the closure member 12 is that a locator 18 may be accommodated in its channel, that is, outside of the casing 8, for assisting in locating the packet 7 of laminations in its required angular position in the pump structure, such locators 18 having also been indicated in FIG. 1. By permitting relative sliding movement between such locator 18 and the casing 8, an allowance can be made for differential expansion between the magnetic structure 4 and the parts of the pump defining the liquid-carrying ducts.

What I claim is:

1. A polyphase alternating current electromagnetic pump of the annular linear induction type comprising a duct of annular cross-section, a linear polyphase winding disposed about the duct for setting up a travelling magnetic field along at least part of the length of the duct, an outer magnetic structure disposed with said winding about the duct, a laminated inner magnetic structure of annular form surrounded by the duct, and an inner duct extending along and within the inner magnetic structure and communicating at one end with said annular duct to provide a reentrant flow path for conductive liquid being pumped wherein said inner magnetic structure comprises a plurality of substantially radially disposed axially extending laminations assembled into a plurality of circumferentially distributed packets each having a sealed metal casing within which the laminations of the packet are contained and which is constituted by a channel-shaped main member comprising an arcuate portion and two radial side portions, together with a closure member sealed in position to enclose the laminations within the channel of the main member.

2. An electromagnetic pump as claimed in claim 1 wherein said closure member for the casing of each packet of laminations is also channel-shaped, comprising an arcuate portion together with two radial portions shorter than the side portions of the main member, which channel-shaped closure member is dimensioned to fit between the side portions of the main member with the arcuate portions substantially concentric, and is sealed thereto along the outer edges of the side portions.

3. An electromagnetic pump as claimed in claim 2 wherein said casing for each packet of laminations is completed by end members of concave form fitted within the ends of the casing as defined by the main channel member and the closure member thereof, these last two members having the end members sealed thereto along their outer edges at each end.

4. An electromagnetic pump as claimed in claim 2 having locators for the packets of laminations each accommodated by the said channel-shaped closure member of the casing of a packet of laminations.

5. An electromagnetic pump as claimed in claim 2 having locators for the packets of laminations each accommodated by and being in slidable relationship with the channel-shaped closure member of the casing of a packet of laminations.

References Cited in the file of this patent

UNITED STATES PATENTS

| | | |
|---|---|---|
| 2,669,183 | Godbold | Feb. 16, 1954 |
| 2,669,931 | Godbold | Feb. 23, 1954 |
| 2,702,004 | Blake et al. | Feb. 15, 1955 |
| 2,808,002 | Erwin | Oct. 1, 1957 |